(No Model.)
J. H. RILEY & J. D. ALBERT.
SAW SET.
No. 250,393.
Patented Dec. 6, 1881.
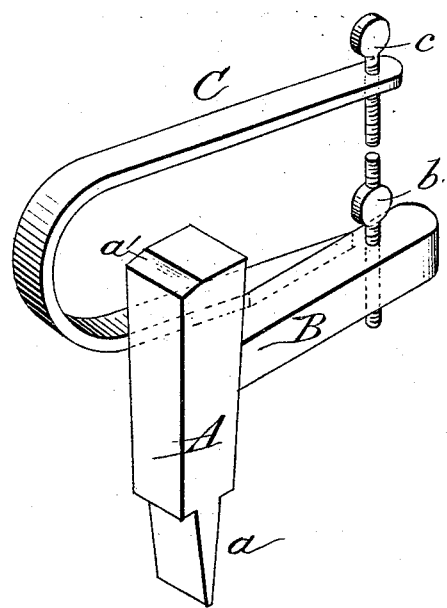
Attest:
F. H. Schott
A. R. Brown
Inventor:
John H. Riley,
John D. Albert,
per J. C. Pasker

UNITED STATES PATENT OFFICE.

JOHN H. RILEY AND JOHN D. ALBERT, OF INDIANAPOLIS, INDIANA.

SAW-SET.

SPECIFICATION forming part of Letters Patent No. 250,393, dated December 6, 1881.

Application filed August 19, 1881. (No model.)

*To all whom it may concern:*

Be it known that we, JOHN H. RILEY and JOHN D. ALBERT, of Indianapolis, in the county of Marion and State of Indiana, have invented certain new and useful Improvements in Saw-Sets; and we do hereby declare that the following is a full, clear, and exact description of the invention, which will enable others skilled in the art to which it appertains to make and use the same, reference being had to the accompanying drawing, which forms a part of this specification.

Our invention relates to devices for setting the teeth of crosscut-saws; and it consists in the construction and arrangement of parts, as hereinafter more fully described and claimed.

In the annexed drawing, which fully illustrates the invention, A represents a vertical bar, having a lower wedge-shaped end or point, $a$, that is driven into a log or other suitable support. The upper end of this upright bar forms an anvil to support the saw, and is beveled at $a'$ in a suitable manner to give the inclination required to the saw-teeth. At one side of the anvil-bar A, near the top, projects a horizontal arm, B, the end of which is perforated for the passage of a thumb-screw, $b$. A yoke, C, projects obliquely from one side of the arm B, and carries at its upper end a thumb-screw, $c$, which projects downward immediately above the screw $b$ and acts in connection therewith as a guide to regulate the degree of set. The saw is passed between the screws $b$ $c$ and laid upon the anvil or upper end of the bar A, with its teeth projecting over the bevel $a'$, in which position it is held at any desired angle by means of the vertical adjustment of the thumb-screws, so that it may be readily passed along, while the requisite degree of set is imparted to the teeth by means of a suitable hammer or other implement in the usual manner. After each alternate tooth has been thus treated the saw is removed from between the thumb-screws and replaced upon its opposite side, while the remaining teeth are treated in a similar manner.

It is obvious that by means of this simple implement the teeth of a saw can be accurately set to any required angle. In order to impart a greater or less set it is only necessary to adjust the thumb-screws $b$ $c$ up or down, so that the saw will rest upon the anvil-block at a greater or less angle with the bevel $a'$, the straight inner edge of which insures a uniform set to the teeth.

The device is simple, compact, and durable, and may be readily applied without the exercise of any considerable skill.

Having thus described our invention, what we claim as new, and desire to secure by Letters Patent, is—

In a saw-set, the combination of the vertical anvil-bar A, having wedge-shaped point $a$ and bevel $a'$, horizontal arm B, provided with thumb-screw $b$, and yoke C, having thumb-screw $c$, substantially as and for the purpose shown and described.

In testimony that we claim the foregoing as our own we have hereto affixed our signatures in presence of two witnesses.

JOHN H. RILEY.
JOHN D. ALBERT.

Witnesses:
EDWARD L. MICK,
JACOB P. HADLEY.